United States Patent [19]

Martinovich et al.

[11] Patent Number: 4,548,971
[45] Date of Patent: Oct. 22, 1985

[54] POLYMER COMPOSITIONS

[75] Inventors: Robert J. Martinovich; Ronald D. Mathis; Roger T. Shiflet, all of Bartlesville, Okla.

[73] Assignee: Phillips Petroleum Company, Bartlesville, Okla.

[21] Appl. No.: 626,842

[22] Filed: Jul. 30, 1984

[51] Int. Cl.[4] .......................... C08K 3/22; C08K 3/40; C08K 5/34; C08L 81/04
[52] U.S. Cl. .............................. 524/101; 264/331.11; 524/425; 524/431; 524/445; 524/451; 525/537
[58] Field of Search ............... 524/101, 431, 425, 445; 264/336.11; 525/451, 388, 537

[56] References Cited

U.S. PATENT DOCUMENTS

| | | | |
|---|---|---|---|
| 3,200,119 | 8/1965 | Hopkins et al. | 260/248 |
| 3,237,592 | 9/1966 | Oswald et al. | 260/45.8 |
| 3,373,301 | 4/1968 | Francis et al. | 260/248 |
| 3,737,411 | 6/1973 | Scroggins | 260/63 |
| 3,998,767 | 12/1976 | Walton | 260/2.5 D |
| 4,018,852 | 4/1977 | Schober | 260/878 R |
| 4,134,874 | 1/1979 | Needham | 260/37 SB |
| 4,176,098 | 11/1979 | Needham | 260/18 R |
| 4,412,062 | 10/1983 | Reed | 528/388 |

*Primary Examiner*—Allan M. Lieberman
*Attorney, Agent, or Firm*—Howard D. Doescher

[57] ABSTRACT

Polymer compositions and method for improving processability of compositions of normally solid polymers of arylene sulfides by the addition of at least one of cyanurate and isocyanurate compounds in an amount effective to improve the processability of the composition. In a preferred embodiment the amount of cyanurate and isocyanurate in the total composition is in the range of about 0.1 to about 10 weight percent. The invention is applicable to improving the processing characteristics and other properties of arylene sulfide polymers and filled arylene sulfide polymers.

19 Claims, No Drawings

POLYMER COMPOSITIONS

FIELD OF INVENTION

This invention relates to improving the characteristics of arylene sulfide polymer compositions. In accordance with another aspect, this invention relates to the use of processing aids in arylene sulfide polymer compositions. In accordance with another aspect, this invention relates to compositions of arylene sulfide polymers, filler materials, and processing aids that improve flow characteristics of arylene sulfide polymer compositions without substantial alteration of other characteristics, especially the physical properties of the polymer compositions. In accordance with another aspect, this invention relates to processing arylene sulfide polymer compositions and filled arylene sulfide polymer compositions. In accordance with a further aspect, this invention relates to the use of cyanurate and isocyanurate compounds to improve the processing characteristics of arylene sulfide polymer compositions.

BACKGROUND OF THE INVENTION

In applications, such as in the formation of various formed articles from arylene sulfide polymers, it is desirable that the melt flow remain substantially unchanged during processing of the polymer. Various procedures have been utilized to stabilize arylene sulfide polymers against changes in physical properties during processing. In most applications in which arylene sulfide polymers are molded, the arylene sulfide polymer must be filled with a relatively large amount of filler material, such as fiberglass, graphite and/or mineral materials. These high loadings of fillers cause a significant reduction in flow which can result in difficulty in compounding and injection molding.

It has now been found that the addition of a small amount of at least one of cyanurate and isocyanurate compounds to filled and unfilled arylene sulfide polymer compositions can considerably increase the flow properties of the total composition without substantial alteration of other physical properties of the polymer.

Accordingly, the object of this invention is to improve the processability of arylene sulfide polymer compositions.

Another object of this invention is to provide compositions containing arylene sulfide polymers suitable for molding operations which have good processability characteristics.

Another object of this invention is to provide a method for improving the processability of compositions containing arylene sulfide polymers.

Other objects, aspects, and the several advantages of the invention will be apparent to those skilled in the art upon a study of the specification and the appended claims.

SUMMARY OF THE INVENTION

According to the invention, the processability of arylene sulfide polymer compositions is improved by the addition of a small effective amount of at least one of cyanurate and isocyanurate compounds.

In accordance with another embodiment of the invention, filled arylene sulfide polymer compositions are improved with respect to processability, especially the flow characteristics, by the incorporation of an effective amount of at least one of cyanurate and isocyanurate compounds.

In another embodiment of the invention, a method is provided for improving the processability of compositions comprising normally solid polymers of arylene sulfide by the addition thereto of an amount of at least one of cyanurate and isocyanurate compounds effective to improve the processability of the composition.

DETAILED DESCRIPTION OF THE INVENTION

The arylene sulfide polymers contemplated for compositions of the invention include those described in U.S. Pat. No. 3,354,129 Edmonds, et al and U.S. Pat. No. 3,919,177 R. W. Campbell. The presently preferred polymer is poly(p-phenylene sulfide), often abbreviated PPS. The term arylene sulfide polymer includes homopolymers and the normally solid arylene sulfide copolymers, terpolymers, and the like, having melting or softening points of at least 300° F. (149° C.) and more preferably from about 400° F. to about 900° F. (204°–482° C.). These polymers are normally solid materials which in an uncured or partially cured state can have melt flow in terms of g/10 minutes according to ASTM method D-1238-74 (316° C. and 5 kg load) ranging from about 10 to about 10,000, more preferably from about 100 to about 3,500.

The cyanurate and isocyanurate compounds suitably employed in this invention can be expressed as:

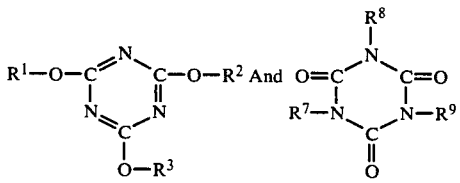

wherein $R^1$, $R^2$, $R^3$ are the same or different hydrocarbyl or substituted hydrocarbyl radicals containing from about 1 to about 12 carbon atoms per molecule selected from alkyl, aryl, alkaryl, allyl and hydrocarbyl-substituted allyl radicals of the type $-CH_2CR^4=CR^5R^6$ where $R^4$ is methyl or hydrogen, $R^5$ and $R^6$ are preferably the same and can be hydrogen or alkyl, aryl and alkaryl containing from 1 to about 10 carbon atoms, and $R^7$, $R^8$, and $R^9$ can be the same or different hydrocarbyl or hydroxy-substituted hydrocarbyl radicals as defined before.

Representative examples of suitable isocyanurate compounds that can be used according to the invention include:

triallyl cyanurate (TAC), presently preferred,
trimethyl cyanurate,
tribenzyl cyanurate,
2,4,6-(p-ethylphenyl) cyanurate,
tridodecyl cyanurate,
trimethallyl cyanurate,
triallyl isocyanurate,
monoallyldi(beta-hydroxyethyl) isocyanurate
diallylmono(beta-hydroxyethyl) isocyanurate
tri(2-hydroxyethyl isocyanurate
tri(3-phenyl-2-propenyl) isocyanurate and the like, and mixtures thereof.

The amount of cyanurate and isocyanurate employed will be sufficient to improve or increase the flow properties of the total composition without substantial alteration of other properties of the polymer composition.

The invention is particularly directed to improving the processability characteristics of arylene sulfide polymers and arylene sulfide polymers admixed with fillers, e.g. clay, talc, iron oxide, carbon black, glass, and the like, and mixtures thereof. The amount of filler present can constitute up to about 75 weight percent of the total composition. Good results are obtained, for example, with compositions having from about 30-70 weight percent filler and about 0.1-10 weight percent cyanurate and isocyanurate compound and the balance arylene sulfide polymer.

Best results have been obtained with molding compositions containing from about 30-65 weight percent poly(p-phenylene sulfide), about 30-60 weight percent glass fibers, and from about 0.1 to about 10 weight percent cyanurate and isocyanurate processing aid.

Highly filled compositions having desirable properties are also provided which contain from about 30-50 weight percent poly(p-phenylene sulfide), from about 10-30 weight percent glass fibers, from about 30-60 weight percent mineral filler, e.g. fused silica, and from about 0.1 to about 10 weight percent, preferably from about 0.5 to 5 weight percent, cyanurate and isocyanurate processing aid. These compositions can also include carbon black and other additives including organic silanes.

The fillers (as well as the other components) in the compositions of this invention are all commercially available materials. Fillers are selected preferably from glass and/or silica but also include others, such as clay, talc, calcium carbonate, and the like.

The glass can be used in the form of fibers and this is preferred. In some intances, however, it is desirable to substitute up to about 75 percent by weight of the glass fibers with glass beads to modify the effects contributed by the glass. The glass beads are also commercially available materials. Desirably, the beads have average diameters ranging from about 10 to about 100 micrometers.

The silica, when employed, can be of natural or synthetic origin. Preferably, a fused (vitreous) silica is used to provide the best results. Fused silica is commercially available as a finely ground material having a relatively narrow particle size distribution ranging from about 1 to about 100 micrometers. Typically it contains about 99.5 weight percent $SiO_2$ with the remaining components comprising $Al_2O_3$, $Fe_2O_3$, $Na_2O$, and $K_2O$.

The organic silanes used in the compositions function as coupling agents for the resin and the fillers and also appear to improve the water resistance and decrease the linear coefficient of expansion. A presently preferred species is 3-mercaptopropyltrimethoxysilane.

Colorants, when employed, are selected from those inorganic and organic compositions which will tolerate high molding temperatures to be used. The temperature can range from about 300° to 600° C. (570°-1110° F.). Suitable colorants include carbon black, titanium dioxide, cadmium sulfide, cadmium sulfoselenide, phthalocyanine blue or green, iron oxide, and the like.

The compositions of the invention can be employed in extrustion and injection molding applications such as in the fabrication of sheets, in the encapsulation of electronic components, such as semiconductor devices, etc. The melt flow properties of the compositions can range from about 5 to about 800 g per/10 minutes as determined according to ASTM procedure D1238-74 (316° C. and a 5 kg weight). The higher melt flow compositions, e.g. 400°-800 g per/10 minutes, are preferably employed in injection molding applications. The lower melt flow compositions are more conveniently used in extrusion.

The compositions can be prepared, for example, by first mixing the components together in a rotating drum blender or in an intensive mixer such as a Henschel mixer and then compounding the resulting mixture above the melting point of the resin by means of an extruder, etc. to produce a uniform blend. The final blend after chopping or pelleting is introduced as feed into extrusion and injection molding operations.

EXAMPLE I

A series of runs was made by individually charging a Brabender Plastigraph with a 70 g composition consisting of particulate PPS prepared according to U.S. Pat. No. 3,354,129 and air cured to a melt flow of 120±20 g/10 minutes, trially cyanurate (TAC), and when used 2,5-dimethyl-2,5-bis(t-butylperoxy)hexyne-3 (DBPH). Each composition was mixed at 300° C. under a nitrogen atmosphere with a rotor speed of 70 RPM for about 20-25 minutes to evaluate changes in torque as a function of time. The quantity of TAC and/or DBPH employed ranged from 0.25 parts by weight per 100 parts by weight polymer (php) to 1.0 php.

The torque measurements obtained showed that the presence of TAC resulted in reduced melt viscosity as measured by torque in meter-grams. The reduction in melt viscosity was observed to be inversely proportional to TAC concentration. The presence of DBPH had no significant effect on melt viscosity. The Brabender Plastigraph melt viscosity results are shown in Table 1.

TABLE 1

Melt Viscosity of PPS Containing TAC and/or DBPH

| Composition | Additive Type | php | Torque, meter grams[1] | Remarks |
|---|---|---|---|---|
| A | None | — | 390 | Control |
| B | TAC | 0.25 | 320 | Invention |
| C | TAC | 0.50 | 265 | Invention |
| D | TAC | 1.00 | 220 | Invention |
| E | DBPH | 0.25 | 400 | Control |
| F | TAC + DBPH | 0.25 each | 325 | Invention |
| G | TAC + DBPH | 0.50 | 260 | Invention |

[1]Measured eight minutes after compositions were charged to the Barbender Plastigraph Melt flow data also showed that TAC alone or in combination with DBPH caused a decrease in melt viscosity (increase in melt flow) relative to the control absent any additive. The addition of DBPH alone resulted in essentially no change in melt flow compared to the control. The melt flow results are given in Table 2.

TABLE 2

Melt Flow Of PPS Containing TAC and/or DBPH

| Composition | Additive Type | php | Melt Flow g/10 mintues | Remarks |
|---|---|---|---|---|
| A | None | — | 195 | Control |
| C | TAC | 0.5 | 210 | Invention |
| H | DBPH | 0.5 | 192 | Control |
| G | TAC + DBPH | 0.5 each | 231 | Invention |

EXAMPLE II

A series of samples was prepared by extrusion compounding 60 weight percent of the same lot of PPS used in Example I with 40 weight percent of glass fibers (Owens Corning #497) and TAC, when employed, at a stock temperature of 560° F. (293° C.). The hot extrudate was converted into pellets by using a hot die face cutter as known in the art. The cooled pellets were subsequently used for injection molding of test samples for the determination of physical properties and for flow properties employing a spiral flow mold. The test methods were as follows:

Tensile strength and elongation: ASTM D638, crosshead speed of 0.2"/min.
Flexural modulus: ASTM D790
Flexural strength: ASTM D790
Izod impact strength: ASTM D256

The test specimens for physical property determinations were prepared using a stock temperature of 600° F. (316° C.) and a mold temperature of 100° F. (38° C.). The spiral flow specimens were prepared using a stock temperature of 615° F. (324° C.), a mold temperature of 200° F. (93° C.), maximum injection speed and the specified gage injection pressure.

Control composition A, in parts by weight, consisted of PPS—60.0 parts and glass fibers—40.0 parts.

Invention composition B, in parts by weight, consisted of PPS—60.0 parts, glass fibers—40.0 parts, and TAC—0.2 parts (0.33 php TAC).

Invention composition C, in parts by weight, consisted of PPS—60.0 parts, glass fibers—40.0 parts, and TAC—0.5 parts (0.67 php TAC).

Invention composition D, in parts by weight, consisted of PPS—60.0 parts, glass fibers—40.0 parts, and TAC—1.0 parts, (1.7 php TAC).

The test results are presented in Table 3.

TABLE 3
Physical Properties of PPS-Glass Fiber-TAC Composition

| Composition No. | A | B | C | D |
|---|---|---|---|---|
| Tensile strength | | | | |
| psi | 13,200 | 14,300 | 14,700 | 15,100 |
| MPa | 91.0 | 98.6 | 101 | 104 |
| Elongation, % | 0.67 | 0.75 | 0.86 | 0.91 |
| Flexural modulus | | | | |
| psi | 1,860,000 | 1,750,000 | 1,770,000 | 1,810,000 |
| GPa | 12.8 | 12.1 | 12.2 | 12.5 |
| Flexural strength | | | | |
| psi | 18,100 | 17,700 | 18,200 | 19,800 |
| MPa | 125 | 122 | 126 | 137 |
| Izod impact strength (75° F.) | | | | |
| ft. lbs./inch, notched | 0.85 | 0.88 | 0.93 | 0.91 |
| J/m | 45 | 47 | 50 | 49 |
| Izod impact strength, (75° F.) | | | | |
| ft. lbs./inch, unnotched | 2.3 | 2.5 | 2.7 | 2.9 |
| J/m | 123 | 133 | 144 | 155 |
| Spiral flow[1] | | | | |
| avg. length | | | | |
| inches | 23¾ | 27⅝ | 30¼ | 33⅝ |
| cm | 60.3 | 70.2 | 76.5 | 85.4 |
| avg. weight, g | 13.0 | 15.1 | 16.5 | 18.5 |

[1]Injection pressure, gage, of 15,000 psi (103 MPa)

Inspection of the data in Table 3 clearly shows that as the TAC content increases from 0 in the control composition A to 1.0 part by weight in invention composition D the average weight of the spiral flow specimen increased from 13.0 g (23¾ inches) to 18.5 g (33⅝ inches). Surprisingly, at the same time the values for tensile strength, elongation and both notched and unnotched impact strength, generally increased relative to the control. The values for flexural modulus showed no appreciable difference relative to the control and the values for flexural strength were about the same or slightly higher than the control depending upon the TAC content.

EXAMPLE 3

Another series of samples was prepared as before from the same PPS-glass fiber composition as in Example 2 but using a greater TAC content.

Control composition A[1], in parts by weight, consisted of PPS—60.0 parts and glass fibers—40.0 parts.

Invention composition E, in parts by weight, consisted of PPS—60.0 parts, glass fibers—40.0 parts and TAC—3.0 parts (5 php TAC).

Invention composition F, in parts by weight, consisted of PPS—60.0 parts, glass fibers—40.0 parts and TAC—5.0 parts (8.3 php TAC).

The results are given in Table 4.

TABLE 4
Physical Properties Of PPS-Glass Fibers-TAC Compositions

| Composition No. | A[1] | E | F |
|---|---|---|---|
| Tensile Strength | | | |
| psi | 13,700 | 13,700 | 14,900 |
| MPa | 94.5 | 94.5 | 103 |
| Elongation, % | 0.75 | 0.85 | 0.96 |
| Flexural modulus | | | |
| psi | 1,740,000 | 1,830,000 | 1,870,000 |
| GPa | 12.0 | 12.6 | 12.9 |
| Flexural Strength | | | |
| psi | 18,000 | 20,700 | 20,000 |
| MPa | 124 | 143 | 138 |
| Izod impact strength (75° F.) | | | |
| ft. lbs./inch, notched | 0.90 | 0.89 | 0.96 |
| J/m | 48 | 48 | 51 |
| Izod impact strength (75° F.) | | | |
| ft. lbs/inch, unnotched | 2.46 | 1.88 | 1.78 |
| J/m | 131 | 100 | 95.0 |
| Spiral flow | | | |
| injection pressure | | | |
| psi | 15,000 | 8,000 | 8,000 |
| MPa | 103 | 55.2 | 55.2 |
| avg. length | | | |
| inches | 25⅞ | 27⅞ | 29¾ |
| cm | 65.7 | 70.8 | 75.6 |
| avg. weight, g | 14.0 | 14.8 | 15.7 |

The results in Table 4 generally show the same trends given in Table 2. That is, the addition of 3 to 5 parts by weight TAC per 100 parts by weight base composition resulted in some increase in tensile strength, elongation, flexural strength, notched Izod strength and spiral flow relative to control base composition A[1]. However, some decrease in unnotched Izod strength relative to control A[1] is noted. Controls A and A[1] are identical in composition and in manner of compounding. The slightly different test results are indicative of those expected and point out that only compositions prepared at the same time should be directly compared. A decrease in injection pressure with the increased TAC content was deemed advisable to be sure that the capacity of the spiral flow mold was not exceeded in view of the expected increased flow of the invention compositions E and F.

EXAMPLE 4

Two series of compositions comprising mineral filled PPS were compounded, then tested as before. Series 1 was made using uncured PPS powder made according to U.S. Pat. No. 3,354,129 having a nominal melt flow in the 3,000 to 8,000 g/10 minute range. Series 2 was made using PPS of the same type as series 1 but air cured to a nominal melt flow in the 850±100 g/10 minute range. Both series of compositions contained the same amounts of mineral filler, glass fibers, TAC (when used), pigment, processing aid, and organic silane. The compositions are given in Table 5.

The data given in Table 6 indicate that about 1 part by weight TAC per 100 parts by weight highly mineral filled PPS can afford some improvement in tensile strength, elongation, flexural strength, Izod impact strength and spiral flow relative to the control compositions. The results suggest that more TAC will improve these properties somewhat based on the preceding examples.

That which is claimed is:

1. A composition comprising normally solid arylene sulfide polymer and at least one of cyanurate and isocyanurate compounds having structural formulas selected from:

TABLE 5

| | Mineral Filled PPS-TAC Compositions | | | |
|---|---|---|---|---|
| Parts by Weight Series No. | 1 | | 2 | |
| Composition No. | A"(Control) | G (Invention) | A'"(Control) | H (Invention) |
| PPS | 34.0[a] | 34.0[a] | 34.0[b] | 34.0[b] |
| Fused silica | 48.6 | 48.6 | 48.6 | 48.6 |
| Glass fibers | 14.6 | 14.6 | 14.6 | 14.6 |
| TAC | 0 | 1.0[e] | 0 | 1.0[e] |
| Carbon black, N110 | 1.0 | 1.0 | 1.0 | 1.0 |
| Processing aid[c] | 1.0 | 1.0 | 1.0 | 1.0 |
| Organic silane[d] | 0.8 | 0.8 | 0.8 | 0.8 |
| | 100.0 | 101.0 | 100.0 | 101.0 |

[a] Melt flow, 3,000 to 8,000
[b] Melt flow, 850 ± 100
[c] Ethylene bis(stearamide)
[d] 3-mercaptopropyltrimethoxysilane
[e] TAC based on 100 parts base composition is 0.99 parts by weight. TAC based on 100 parts by weight polymer is 2.9 parts by weight.

Test specimens molded as before from each of the Table 5 compositions were tested as described before. The results are given in Table 6.

TABLE 6

| | Physical Properties Of Mineral Filled PPS-TAC Compositions | | | |
|---|---|---|---|---|
| Series No. Composition No. | A"(Control) | G (Invention) | A'"(Control) | H (Invention) |
| Tensile Strength | | | | |
| psi | 6,550 | 7,575 | 8,050 | 8,200 |
| MPa | 45.2 | 52.2 | 55.5 | 56.5 |
| Elongation, % | 0.30 | 0.34 | 0.33 | 0.43 |
| Flexural modulus | | | | |
| psi | 2,220,000 | 2,190,000 | 2,290,000 | 2,200,000 |
| GPa | 15.3 | 15.1 | 15.8 | 15.2 |
| Flexural strength | | | | |
| psi | 10,200 | 10,800 | 11,600 | 10,100 |
| MPa | 70.3 | 74.5 | 80.0 | 69.6 |
| Izod impact strength (75° F.) | | | | |
| ft. lbs/inc, notched | 0.40 | 0.41 | 0.37 | 0.43 |
| J/m | 21 | 22 | 20 | 23 |
| Izod impact strength (75° F.) | | | | |
| ft. lbs/inch, unnotched | 0.85 | 0.88 | 1.0 | 0.92 |
| J/m | 45 | 47 | 53 | 49 |
| Spiral flow | | | | |
| injection pressure | | | | |
| psi | 8,000 | 8,000 | 8,000 | 8,000 |
| MPa | 55.2 | 55.2 | 55.2 | 55.2 |
| avg. length | | | | |
| inches | 16¾ | 17½ | 16 | 16½ |
| cm | 42.5 | 44.5 | 40.6 | 41.9 |
| avg. weight, g | 0.59 | 0.60 | 0.59 | 0.64 |

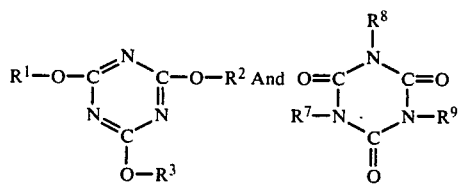

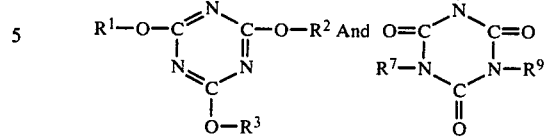

wherein $R^1$, $R^2$, $R^3$ are the same or different hydrocarbyl or substituted hydrocarbyl radicals containing from 1 to about 12 carbon atoms per molecule selected from alkyl, aryl, alkaryl, allyl and hydrocarbyl-substituted allyl radicals of the type $-CH_2CR^4=CR^5R^6$ where $R^4$ is methyl or hydrogen, $R^5$ and $R^6$ are preferably the same and can be hydrogen or alkyl, aryl and alkaryl containing from 1 to about 10 carbon atoms and $R^7$, $R^8$, $R^9$ can be the same or different hydrocarbyl in an amount sufficient to increase melt flow relative to the polymer absent any additive and thereby improve the processability of said composition.

2. A composition according to claim 1 wherein said polymer is poly(p-phenylene sulfide).

3. A composition according to claim 1 wherein said cyanurate compound is triallyl cyanurate and said polymer is poly(p-phenylene sulfide.)

4. A composition according to claim 1 wherein the amount of isocyanurate and/or cyanurate compound ranges from about 0.1 to about 10 weight percent of the total composition.

5. A composition according to claim 1 which comprises filler in an amount of up to about 75 percent by weight of the total composition and said compound is a cyanurate having the formula

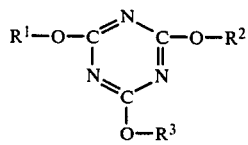

wherein $R^1$, $R^2$, $R^3$ are the same or different hydrocarbyl or substituted hydrocarbyl radicals containing from 1 to about 12 carbon atoms per molecule selected from alkyl, aryl, alkaryl, allyl and hydrocarbyl-substituted allyl radicals of the type $-CH_2CR^4=CR^5R^6$ where $R^4$ is methyl of hydrogen, $R^5$ and $R^6$ are preferably the same and can be hydrogen or alkyl, aryl and alkaryl containing from 1 to about 10 carbon atoms.

6. A composition according to claim 5 wherein about 30 to 60 weight percent of the total composition is poly(p-phenylene sulfide), from about 10–30 weight percent is glass fibers, from about 30–60 weight percent is mineral filler, and about 0.1 to about 10 weight percent is cyanurate.

7. A composition according to claim 6 wherein said filler is selected from glass, talc, iron oxide, carbon black, clays, and mixtures thereof.

8. A composition according to claim 7, which additionally contains 2,5-dimethyl-2,5-bis(t-butylperoxy)-hexyne-3 (DBPH).

9. A composition comprising normally solid arylene sulfide polymer and from about 0.1 to about 10 weight percent of the total composition of at least one of cyanurate and isocyanurate compound having the structural formula wherein $R^1$, $R^2$, $R^3$ are the same or different hydrocarbyl or substituted hydrocarbyl radicals containing from 1 to about 12 carbon atoms per molecule selected from alkyl, aryl, alkaryl, allyl and hydrocarbyl-substituted allyl radicals of the type $-CH_2CR^4=CR^5R^6$ where $R^4$ is methyl or hydrogen, $R^5$ and $R^6$ are preferably the same and can be hydrogen or alkyl, aryl and alkaryl containing from 1 to about 10 carbon atoms and $R^7$, $R^8$, $R^9$ can be the same or different hydrocarbyl.

10. A composition according to claim 9 which comprises filler in an amount of up to 75 weight percent by weight of the total composition and said compound is a cyanurate having the formula

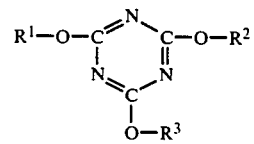

wherein $R^1$, $R^2$, $R^3$ are the same or different hydrocarbyl or substituted hydrocarbyl radicals containing from 1 to about 12 carbon atoms per molecule selected from alkyl, aryl, alkaryl, allyl and hydrocarbyl-substituted allyl radicals of the type $-CH_2CR^4=CR^5R^6$ where $R^4$ is methyl or hydrogen, $R^5$ and $R^6$ are preferably the same and can be hydrogen or alkyl, aryl and alkaryl containing from 1 to about 10 carbon atoms.

11. A composition according to claim 10 which comprises about 30 to about 60 weight percent filler.

12. A composition according to claim 11 wherein said filler is glass, said cyanurate compound is triallyl cyanurate, and said polymer is poly(p-phenylene sulfide).

13. A process for improving the processability of compositions comprising polymers of arylene sulfides which comprises the addition of at least one of cyanurate and/or isocyanurate compounds having structural formulas selected from:

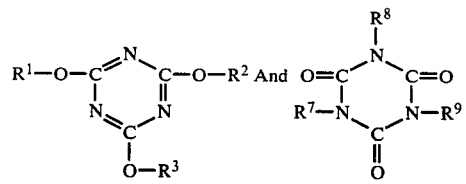

wherein $R^1$, $R^2$, $R^3$ are the same or different hydrocarbyl or substituted hydrocarbyl radicals containing from 1 to about 12 carbon atoms per molecule selected from alkyl, aryl, alkaryl, allyl and hydrocarbyl-substituted allyl radicals of the type $-CH_2CR^4=CR^5R^6$ where $R^4$ is methyl or hydrogen, $R^5$ and $R^6$ are preferably the same and can be hydrogen or alkyl, aryl and alkaryl containing from 1 to about 10 carbon atoms and $R^7$, $R^8$, $R^9$ can be the same or different hydrocarbyl in an amount sufficient to increase melt flow relative to the polymer absent any additive and thereby improve the processability of said composition.

14. A process according to claim 13 which comprises filler in an amount of up to about 75 weight percent by weight of the total composition.

15. A process according to claim 14, wherein about 30–70 weight percent of the total composition is filler, about 0.1 to about 10 weight percent is at least one cyanurate and isocyanuate compound, and the balance of the composition is poly(p-phenylene sulfide).

16. A method according to claim 14, wherein said filler is selected from glass, talc, silica, iron oxide, carbon black, clays, and mixtures thereof.

17. A process according to claim 13 wherein said compound is a cyanurate having the structural formula:

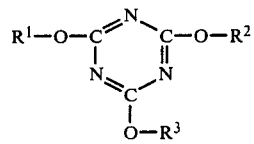

wherein $R^1$, $R^2$, $R^3$ are the same or different hydrocarbyl or substituted hydrocarbyl radicals containing from 1 to about 12 carbon atoms per molecule selected from alkyl, aryl, alkaryl, allyl and hydrocarbyl-substituted allyl radicals of the type $-CH_2CR^4\!=\!CR^5R^6$ where $R^4$ is methyl or hydrogen, $R^5$ and $R^6$ are preferably the same and can be hydrogen or alkyl, aryl and alkaryl containing from 1 to about 10 carbon atoms.

18. A method according to claim 14 wherein said polymer, filler, and one of cyanurate and isocyanurate compounds are intensively mixed and the resulting mixture is compounded above the melting point of the polymer to produce a uniform blend.

19. A process according to claim 17 wherein said cyanurate is triallyl cyanurate and said polymer is poly(p-phenylene sulfide).

* * * * *